Patented July 31, 1951

2,562,857

UNITED STATES PATENT OFFICE 2,562,857

PRODUCTION OF ETHYLENE OXIDE BY THE CATALYTIC OXIDATION OF ETHYLENE

Adrien Cambron and Francis L. W. McKim, Ottawa, Ontario, Canada, assignors to the Honorary Advisory Council for Scientific and Industrial Research, Ottawa, Ontario, Canada, a corporation of Canada No Drawing. Original application March 10, 1948, Serial No. 14,153. Divided and this application March 24, 1950, Serial No. 151,822.

5 Claims. (Cl. 260—348.5)

This invention relates to the production of ethylene oxide by the catalytic oxidation of ethylene.

This application is a division of application Serial Number 14,153, filed March 10, 1948, now abandoned.

In preparing the catalyst used in the invention of this application silver is alloyed with calcium, or other alkaline earth metal such as magnesium, barium and strontium, and substantially all or at least 5% of the alloying calcium or other alkaline earth metal is removed from the alloy to provide the desired catalyst. It is preferred to remove a large proportion of the calcium, since it has been found that such catalysts have longer life. Removal of 5% or less of the calcium gives an active catalyst but its life is relatively short. Removal of upwards of 80% of the calcium yields catalysts of long life.

Active catalysts may be made from alloys containing about one percent of calcium, or other alkaline earth metal. The upper limit of calcium content may vary widely. Alloys containing less than about 5% calcium are somewhat malleable and are readily comminuted by turning, while those containing more than about 5% calcium are brittle and may be comminuted by crushing. Alloys containing from about 5 to about 15% of calcium are satisfactory for preparing catalysts in the form of coarse grains. The malleable alloys containing about 2 to 4% of calcium may be drawn into wire and formed into mesh cloth which may then be chemically treated to give the active catalyst. The mesh cloth form catalyst is particularly effective because it permits control of the temperature in the reaction zone by facilitating heat transfer to or from the catalyst.

Alloys having calcium contents of more than 5% may be used in pelleted form after chemical reduction of the alloy. Alloys containing more than 15% of calcium may be reduced chemically to yield fine particles which may be formed into pellets. That is to say the chemical treatment removes a proportion of the calcium from the alloy to render the latter catalytically active. As previously stated at least 5% of the calcium or other alkaline earth metal must be removed to render the alloy catalytically active for oxidation purposes.

In preparing the catalyst silver, preferably oxygen free, and calcium are conveniently melted in a steel crucible under an inert gas such as dry argon or helium. The mixture is heated in the crucible to about 975° C. to form a liquid which is solidified by cooling and the solid alloy is comminuted into turnings or into particles or grains as by crushing. Comminution may be effected in other ways such as disintegration by spraying the molten alloy into an inert gas such as helium or argon.

Turnings of the alloy may be conveniently about ¼ to about ½ mm. thick and grains or particles of crushed alloy may range in size from about ¼ mm. to about 5 mm. in diameter for use in simple metallic tube reactors. Sizes finer than about ½ mm. diameter render the carrying out of the oxidation process in such reactors difficult because of the higher resistance to fluid flow. Gradations of sizes may be used. Thus grains 1.5 to 3 mm., 0.8 to 1.5 mm. and 0.4 to 0.8 mm. diameter have been used. The catalyst may also be formed into pellets.

The sizes of particles may be selected to permit of the use of the so-called "fluidized" method, that is, where the particles are caused to be suspended in a flowing stream of reacting fluid.

Chemical treatment of the alloy particles has been conveniently accomplished by passing air, which may be moist, or steam over them at a temperature of about 350° C. for several hours so as to oxidize the calcium of the alloy. Lower temperatures of oxidization require longer times of treatment to accomplish the desired result. A temperature below about 250° C. is not practical. The oxidation should not be at a temperature much above 400° C. Alloys containing larger amounts of calcium oxidize more readily.

After the oxidation treatment the particles or grains are treated with an aqueous solution of an acid which does not react significantly with silver and which forms water soluble calcium salts. Acetic acid, formic acid, and citric acid have been found suitable for example in concentrations of from about 5% to about 50%. A solution of four percent hydrochloric acid was satisfactory. Dilute nitric acid in a concentration of about 5%, may be used.

The silver calcium alloy particles may thus be chemically reduced by increasing the proportion of the more electronegative component therein, viz. the silver. At least 5% of the calcium must be removed.

The chemical reducing treatment of the alloy particles may be combined in one operation by treating with an aqueous acid solution containing an oxidizing agent that is non-reactice with the acid. A 20% solution of acetic acid containing 0.2% of hydrogen peroxide has been used successfully to oxidize and remove calcium from particles of silver-calcium alloys to give a residue having high catalytic activity in the oxidation of ethylene to ethylene oxide.

Illustratively, 25.0 grams of silver calcium alloy in particles about 0.8 to 1.7 mm. diameter and containing 6.5% calcium were treated with 1750 cc. of a 20% acetic acid solution containing 8 grams (about 0.5%) of potassium permanganate and heated at 90-95° C. for 1½ hours until the permanganate was all reduced to manganese dioxide. This solution was removed and the grains were treated with a solution of hydrochloric acid to remove manganese dioxide, followed by thorough washing and drying.

The catalytically active particles or grains comprising silver may advantageously be placed in metallic tubes through which the oxidizing reaction mixture is passed at controlled temperatures. Suitable known heat exchange media may be flowed around these tubes at controlled temperatures.

The method of the present invention is illustrated by the following examples.

(1) A silver-calcium alloy containing 5.25% calcium was crushed and 44.1 grams of the alloy ranging in size of grain from about 0.8 mm. to about 1.7 mm. was oxidized in moist air at 400° C. for 48 hours and was treated with 20% acetic acid for 5 minutes, washed and dried. The catalyst contained 3.58% of calcium. It was put into an aluminum tube 12.7 mm. in diameter filling the tube to a depth of about 90 mm. A gas mixture of 2 litres per hour of ethylene and 30 litres per hour of air was passed through the catalyst at a temperature of 268° C. On the 24th day of operation 93.3% of the ethylene reacted and 45.4% of the reacted ethylene was recovered as ethylene oxide.

(2) A silver-calcium alloy containing 6.5% calcium was crushed and 25 grams of the alloy in the size range of about 0.8 mm. to 1.7 mm. was treated with 280 ml. of 20% acetic acid containing 1.8 ml. of 30% hydrogen peroxide; the acetic acid solution thus contained 0.2% $H_2O_2$. The grains of alloy were boiled in this solution for one hour and the solution was removed and the grains were washed in water and then boiled in water 3 minutes twice, followed by a wash in methanol and drying at about 85° C. The catalyst contained 3.9% of calcium after this treatment. The catalyst was placed in a 12.7 mm. diameter aluminum tube which was filled to a depth of about 55 mm. and while heating to 276° C. a mixture of 2 litres per hour of ethylene and 30 litres per hour of air was passed through the catalyst. On the 5th day of operation 75.6 per cent of the ethylene reacted and of the reacted ethylene 54.5 per cent was recovered as ethylene oxide.

(3) A silver-calcium alloy containing 10.3% calcium was crushed and 25.0 gms. of it ranging in size of grain from about 0.4 mm. to about 0.8 mm. was oxidized in moist air at 400° C. for 21 hours after which it was heated on a steam bath and treated with 100 ml. of 20% acetic acid for 1 hour. It was then decanted and again heated for 1 hour with 100 ml. of 20% acetic acid, washed and dried. Traces of calcium were present in the catalyst. 16 gms. of the catalyst was put into a 12.7 mm. aluminum tube filling it to a depth of about 50 mm. A gas mixture of 2 litres of ethylene per hour and 30 litres of air per hour was passed through the catalyst at a temperature of 264° C. On the seventh day 75.9% of the ethylene reacted and 59.7% of the reacted ethylene was recovered as ethylene oxide.

(4) A silver-calcium alloy containing 9.75% of calcium was crushed and 50 grams of the alloy ranging in size of grain from about 0.4 mm. to 0.8 mm. was treated in a 38.1 mm. electrically heated stainless steel tube with nitrogen at 70 litres per hour containing approximately 10% steam at a temperature of 350° C. for 1 hour when the temperature was increased to 375° C. and approximately 300 grams per hour of steam was passed through the crushed alloy for 4 hours. The oxidized alloy was treated with 20% acetic acid for two hours, washed and dried. The catalyst contained 0.03% calcium. 16 grams of the catalyst was put into a 12.7 mm. aluminum tube filling it to a depth of about 50 mm. A gas mixture of 2 litres of ethylene per hour and 30 litres of air per hour was passed continuously through the catalyst at temperatures between 270° and 280° C. On the 29th day of operation 90% of the ethylene reacted and 57% of the reacted ethylene was recovered as ethylene oxide.

(5) A silver-calcium alloy containing 9.25% calcium was crushed and 20 grams of the alloy ranging in size of grain from about 0.4 mm. to 0.8 mm. was treated in a 20 mm. glass U-tube with steam for one hour at a temperature of 350° C. The oxidized alloy was treated with 20% acetic acid for two hours, washed and dried. Traces of calcium were present in the resulting catalyst. 17 grams of the catalyst were put into a 12.7 mm. aluminum tube filling it to a depth of about 50 mm. A gas mixture of 2 litres of ethylene per hour and 30 litres of air per hour was passed continuously through the catalyst at temperatures between 270° and 285° C. On the 224th day of operation 84.2% of the ethylene reacted at a temperature of 285° C. and 54.7% of the reacted ethylene was recovered as ethylene oxide. The activity of the catalyst was undiminished after 224 days of operation.

(6) A silver calcium alloy containing 9.9% calcium was crushed and 25 grams of the alloy ranging in size of grain from about 0.8 mm. to 1.7 mm. was treated with a mixture of 90% nitrogen and 10% steam at a temperature of 350° C. for one half hour and then with steam only at 350° C. for one hour. The oxidized alloy was treated with 250 cc. of 20% aqueous acetic acid for one hour and the solution decanted. The alloy was then boiled for one-half hour in 250 cc. of aqueous 20% acetic acid, decanted, washed with water, then methanol and dried. The so treated alloy particles were treated for 20 minutes at room temperature in an aqueous solution containing 0.02 grams chlorplatinic acid

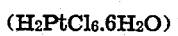
($H_2PtCl_6.6H_2O$)

and then washed with water. The catalyst particles resulting contained 1.5% calcium. 16 grams of the catalyst were put into a 12.7 mm. aluminum tube filling it to a depth of about 50 mm. A gas mixture of two liters of ethylene per hour and 30 liters of air per hour was passed continuously through the catalyst at a temperature of 265° C. On the 147th day of operation 84.8% of the ethylene reacted and of the reacted ethylene 56.5% was recovered as ethylene oxide.

High catalytic activity is maintained over a long period of time and temperature control during the operation is facilitated by the catalyst.

What is claimed is:

1. A method of producing ethylene oxide which comprises reacting ethylene with oxygen at a temperature not substantially less than 264° C. in the presence of a catalyst comprising essentially an alloy of silver and 1 to 15 of an alkaline earth metal from which at least 5% of the alkaline earth metal has been removed to render the alloy catalytically active.

2. A method of producing ethylene oxide which comprises reacting ethylene with oxygen at a temperature not substantially less than 264° C. in the presence of a catalyst comprising an alloy of sliver and 1 to 15% of calcium from which at least 5% of the calcium has been removed to render the alloy catalytically active.

3. A method of producing ethylene oxide which comprises passing ethylene and oxygen through particles of an alloy of silver and 1 to about 15% of calcium from which 5 to 80% of the calcium has been removed to render the alloy catalytically active and maintaining a reaction temperature of not substantially less than 264° C.

4. A method of producing ethylene oxide which comprises passing a mixture of ethylene and oxygen in intimate contact with an alloy of silver and 1 to about 15% of calcium from which at least 5% of the calcium has been removed to render the alloy catalytically active and maintaining a reaction temperature of substantially 264–285° C.

5. A method as defined in claim 4 wherein said mixture contains substantially 1 part of ethylene per 15 parts by volume of air.

ADRIEN CAMBRON.
FRANCIS L. W. McKIM.

REFERENCES CITED

The following references are of record in the file of this patent:

UNITED STATES PATENTS

| Number | Name | Date |
|---|---|---|
| 2,177,361 | Carter | Oct. 24, 1939 |